US011949328B2

(12) United States Patent
Jaksa et al.

(10) Patent No.: US 11,949,328 B2
(45) Date of Patent: Apr. 2, 2024

(54) BOOTSTRAP PRE-CHARGE CIRCUIT IN TOTEM-POLE POWER FACTOR CORRECTION CONVERTER

(71) Applicant: Murata Manufacturing Co., Ltd., Nagaokakyo (JP)

(72) Inventors: Rubinic Jaksa, Markham (CA); Anil Yaramasu, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 265 days.

(21) Appl. No.: 17/425,387

(22) PCT Filed: Dec. 19, 2019

(86) PCT No.: PCT/US2019/067310
§ 371 (c)(1),
(2) Date: Jul. 23, 2021

(87) PCT Pub. No.: WO2020/159640
PCT Pub. Date: Aug. 6, 2020

(65) Prior Publication Data
US 2022/0094262 A1 Mar. 24, 2022

Related U.S. Application Data

(60) Provisional application No. 62/704,051, filed on Jan. 28, 2019.

(51) Int. Cl.
*H02M 1/42* (2007.01)
*H02M 1/00* (2006.01)

(52) U.S. Cl.
CPC ....... *H02M 1/4233* (2013.01); *H02M 1/0006* (2021.05)

(58) Field of Classification Search
CPC .... H02M 1/0006; H02M 1/4233; H02M 1/36; H02M 7/219
See application file for complete search history.

(56) References Cited

U.S. PATENT DOCUMENTS 9,735,686 B2 * 8/2017 Adragna ............. H02M 3/3376
2009/0027925 A1 1/2009 Kanouda et al.
(Continued)

FOREIGN PATENT DOCUMENTS

CN 106602900 A 4/2017
CN 108075635 A 5/2018
(Continued)

OTHER PUBLICATIONS

Official Communication issued in International Patent Application No. PCT/US2019/067310, dated Apr. 21, 2020.
(Continued)

*Primary Examiner* — Alex Torres-Rivera
(74) *Attorney, Agent, or Firm* — Keating & Bennett, LLP (57) ABSTRACT

A power factor correction converter that outputs a DC output voltage from an AC input voltage, includes two channels each including a high-side switch and a low-side switch connected in cascade between a positive output terminal and a negative output terminal of the power factor correction converter and with a node between the high-side switch and the low-side switch; an inductor connected to a first terminal of the AC input voltage and the first node; a gate driver connected to the second high-side switch and the second low-side switch; a bootstrap circuit connected to the second node and the gate driver; wherein the second node is connected to a second terminal of the AC input voltage; and the bootstrap circuit is pre-charged at beginnings of negative half-cycles of the AC input voltage.

9 Claims, 6 Drawing Sheets

(56) References Cited

U.S. PATENT DOCUMENTS

| | | | |
|---|---|---|---|
| 2012/0262144 A1 | 10/2012 | Lyons | |
| 2013/0076322 A1* | 3/2013 | Tateno | H02M 3/158 |
| | | | 323/271 |
| 2015/0115812 A1 | 4/2015 | Lee | |
| 2017/0324411 A1* | 11/2017 | Gong | H02M 3/07 |
| 2018/0019695 A1 | 1/2018 | Hasegawa et al. | |
| 2020/0343811 A1* | 10/2020 | Xiang | H02M 1/4225 |
| 2021/0006149 A1* | 1/2021 | Zong | H02M 7/53871 |
| 2021/0050779 A1* | 2/2021 | Deng | H02M 3/073 |
| 2021/0184576 A1* | 6/2021 | Cattani | H02M 1/08 |

FOREIGN PATENT DOCUMENTS

| | | |
|---|---|---|
| JP | 2016-226093 A | 12/2016 |
| JP | 2016220378 A | 12/2016 |
| KR | 10-2018-0004677 A | 1/2018 |
| KR | 10-2018-0091543 A | 8/2018 |

OTHER PUBLICATIONS

Extended European Search Report in 19913920.5, dated Jul. 29, 2022, 31 pages.
STMicroelectronics, "L6699 Enhanced high voltage resonant controller, Datasheet—production data", Doc ID 022835 Rev 2, Jan. 2013, pp. 1-38.
Official Communication issued in corresponding European Patent Application No. 19913920.5, dated Feb. 19, 2024.

\* cited by examiner

BOOTSTRAP PRE-CHARGE CIRCUIT IN TOTEM-POLE POWER FACTOR CORRECTION CONVERTER

BACKGROUND OF THE INVENTION

1. Field of the Invention

The present invention relates to totem-pole power factor correction (PFC) converters. More specifically, the present invention relates to a bootstrap pre-charge circuit in a totem-pole PFC converter.

2. Description of the Related Art

In half and full bridge circuit configurations, transistors or switches in each leg of the bridge are connected in cascade. In a totem-pole PFC converter (TPPFC), the source terminal of a low-side transistor is connected to a PFC return (PFC V−). Generally, a positive gate-source voltage Vgs of a few volts is enough to turn on a metal-oxide-semiconductor field-effect transistor (MOSFET). Likewise, a positive gate-source voltage Vgs usually higher than 2 V is needed to turn on an n-channel MOSFET for power devices. Low voltages from power supplies usually are readily available in most applications, thus driving the low-side MOSFET is seldom a problem. However, the source terminal of the high-side MOSFET in a half- or full-bridge circuit is connected to the middle point of a cascaded configuration, which is also the drain terminal of the low side MOSFET. This connection point is commonly known as a half-bridge (HB) node. Therefore, a positive gate voltage has to be generated at the HB node in order to turn ON the high-side MOSFET. Because voltage at the HB node can reach as high as the rectified output voltage of the bridge circuit, it is necessary to provide a higher gate-source voltage Vgs to turn on the high-side MOSFET.

Several methods of producing the gate-source voltage Vgs have been used to turn ON the high-side MOSFET. One approach is to have a separate power supply for the high-side gate driver that can be derived from a transformer winding in the circuit. Another approach is to use an existing available power source and a bootstrap circuit connected to the HB node. The bootstrap-circuit solution uses less components and space but requires careful consideration in the design process to assure proper operation. If a bootstrap circuit is used in a totem-pole topology for the high-side gate driver, there may be problems when starting the PFC converter in the negative portion of the AC cycle, unless a capacitor in the bootstrap circuit is pre-charged.

However, in a dual-channel TPPFC converter, the second channel may be disengaged under certain conditions to improve efficiency. Nevertheless, the second channel should be able to be operated without delay when required. Bootstrapping the high-side power supply input without pre-charging the bootstrap capacitor may create significant delays of a few milliseconds if the channel is engaged in the negative half-cycle of the input AC voltage. This is problematic under certain conditions. One of the situations when the channel is required to start immediately is during a converter recovery after line dropout. If the recovery moment falls in the negative AC half-cycle, the second channel will not start for the duration of the negative half-cycle. Usually the control circuitry that drives the MOSFETs is not responsive to issues like a line dropout condition and will drive both channels with 50% power, assuming both of the high-side and low-side channels are operational. In this case, only one channel is active and provides half the power needed. The result is a further drop in the converter output voltage, which may cause the next converter stage to shut down due to an under-voltage input condition. Such operational behavior limits the ride-through capability of the converter.

Another condition that may cause a delay problem is during a transient in the load. A delay in the boost operation of the second channel will cause the output voltage tracking error to increase. The control circuitry can normally compensate by generating more power from the primary channel. However, overstressing one channel may cause problems such as reaching the maximum allowed current. The transient response of the converter also suffers because a sudden engagement of the second channel during a positive portion of the AC input voltage produces an overshoot in the output voltage due to previous power compensation from the control circuitry. Significant overshoot may set various warning flags due to an overvoltage condition. The control circuitry will eventually correct for this issue and set the power delivered to output at the correct value, but the overall transient response and performance of the converter is deteriorated.

As mentioned above, one method of producing the necessary gate-source voltage Vgs to turn ON the high-side MOSFET is to use a dedicated transformer winding to power the high-side gate driver. However, a dedicated winding requires an additional rectifier and a filter. On the other hand, using an existing power supply with a bootstrap circuit is a simpler alternative, but suffers from the limitations discussed above.

SUMMARY OF THE INVENTION

To overcome the problems described above, preferred embodiments of the present invention provide pre-charging circuits of a bootstrap power supply that charges a bootstrap capacitor after an AC input zero-crossing from a positive AC half cycle to a negative AC half cycle.

A method according to a preferred embodiment of the present invention is applicable to single- and dual-channel totem-pole PFC converters. When one channel of a dual channel totem-pole PFC converter is off, the converter can operate as a single channel converter.

According to a preferred embodiment of the present invention, a power factor correction converter that outputs a DC output voltage from an AC input voltage includes a first high-side switch and a first low-side switch connected in cascade between a positive output terminal and a negative output terminal of the power factor correction converter and with a first node between the first high-side switch and the first low-side switch; a second high-side switch and a second low-side switch connected in cascade between the positive output terminal and the negative output terminal and with a second node between the second high-side switch and the second low-side switch; an inductor connected to a first terminal of the AC input voltage and the first node; a gate driver connected to the second high-side switch and the second low-side switch; a bootstrap circuit connected to the second node and the gate driver; wherein the second node is connected to a second terminal of the AC input voltage; and the bootstrap circuit is pre-charged at beginnings of negative half-cycles of the AC input voltage.

Preferably, the first high-side switch and the first low-side switch define a first channel, and the second high-side switch and the second low-side switch are line transistors.

The power factor correction converter further preferably includes a third high-side switch and a third low-side switch connected in cascade between the positive output terminal and the negative output terminal and with a third node between the second high-side switch and the second low-side switch. Preferably, the first high-side switch and the first low-side switch define a first channel; the second high-side switch and the second low-side switch define a second channel; and the third high-side switch and the third low-side switch are line transistors.

Preferably, the first channel is engaged by turning on and off the first high-side switch and the first low-side switch in a complementary manner, and the second channel is disengaged by turning off both the second high-side switch and the second low-side switch, except to turn on the second low-side switch to pre-charge the bootstrap circuit at the beginnings of the negative half-cycles of the AC input voltage.

Preferably, when the second channel is engaged by turning on and off the second high-side switch and the second low-side switch in a complementary manner, the bootstrap circuit is not pre-charged.

Preferably, during positive half-cycles of the AC input voltage, during boost operation of the first channel, the first low-side switch and the third low-side switch are turned on, and the first high-side switch and the third high-side switch are turned off; during boost operation of the second channel, the second low-side switch and the third low-side switch are turned on, and the second high-side switch and the third high-side switch are turned off; during synchronous operation of the first channel, the first high-side switch and the third low-side switch are turned on, and the first low-side switch and the third high-side switch are turned off; and during synchronous operation of the second channel, the second high-side switch and the third low-side switch are turned on, and the second low-side switch and the third high-side switch are turned off. Preferably, during negative half-cycles of the AC input voltage, during boost operation of the first channel, the first high-side switch and the third high-side switch are turned on, and the first low-side switch and the third low-side switch are turned off; during boost operation of the second channel, the second high-side switch and the third high-side switch are turned on, and the second low-side switch and the third low-side switch are turned off; during synchronous operation of the first channel, the first low-side switch and the third high-side switch are turned on, and the first high-side switch and the third low-side switch are turned off; and during synchronous operation of the second channel, the second low-side switch and the third high-side switch are turned on, and the second high-side switch and the third low-side switch are turned off.

Preferably, the bootstrap circuit includes a diode and a capacitor connected in series with each other, and pre-charging the bootstrap circuit pre-charges the capacitor.

According to a preferred embodiment of the present invention, a control circuit for a power factor correction converter that outputs a DC output voltage from an AC input voltage includes a gate driver including a high-side driver terminal connected to a high-side switch of the power factor correction converter to turn the high-side switch on and off; a low-side driver terminal connected to a low-side switch of the power factor correction converter to turn the low-side switch on and off; a high-side ground terminal connected to a node between the high-side switch and the low-side switch; a low-side ground terminal connected to a negative output terminal of the power factor correction converter; a high-side voltage terminal; and a low-side voltage terminal, a controller connected to the gate driver, a bootstrap circuit including a bootstrap capacitor connected in parallel with the high-side voltage terminal and the high-side ground terminal and connected to the node; and a diode connected between the bootstrap capacitor and the low-side voltage terminal, and a capacitor connected in parallel with the low-side voltage terminal and the low-side ground terminal and connected to the negative output terminal. The controller is programmed or configured to turn on the low-side switch to pre-charge the bootstrap capacitor at beginnings of negative half-cycles of the AC input voltage.

Preferably, the controller disengages a channel of the power factor correction converter by turning off both the high-side switch and the low-side switch, except to turn on the second low-side switch to pre-charge the bootstrap circuit at the beginnings of the negative half-cycles of the AC input voltage.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
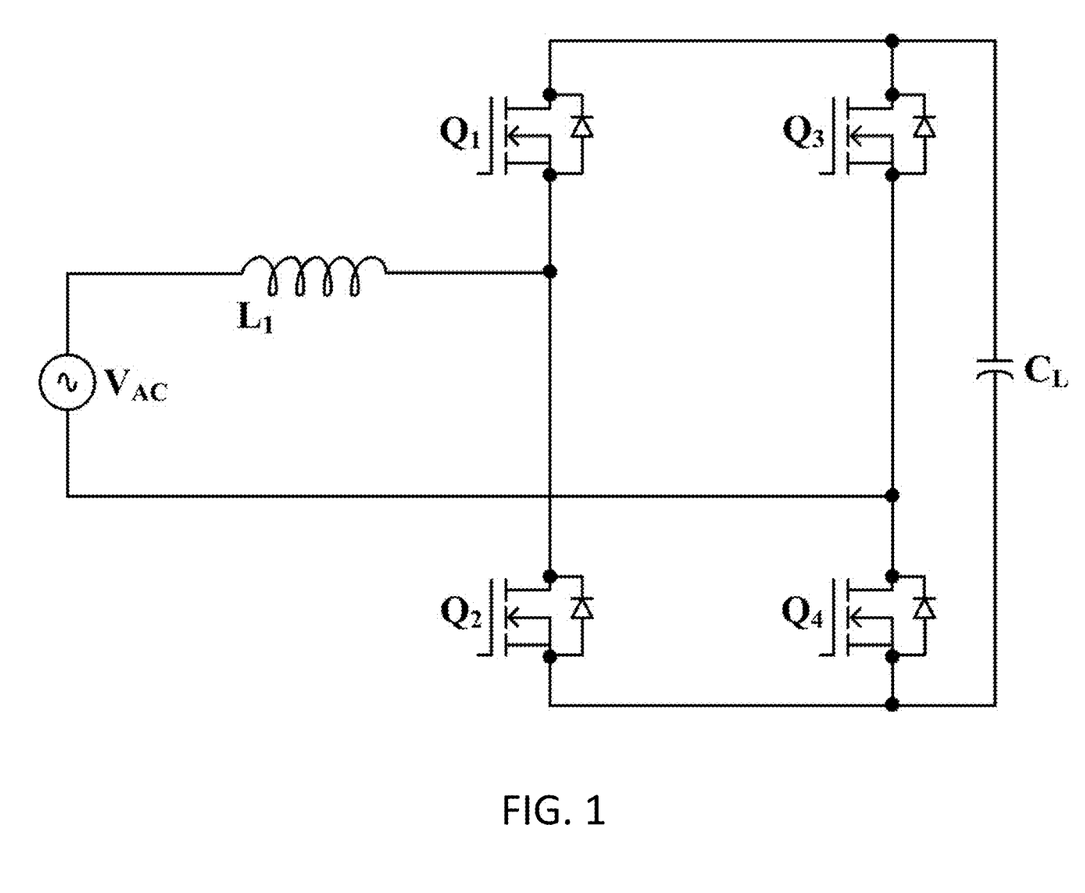
FIG. 1 is a circuit diagram of a single-channel PFC totem-pole boost converter according to a preferred embodiment of the present invention.

FIG. 1 is a circuit diagram of a single-channel TPPFC boost converter according to a preferred embodiment of the present invention. In FIG. 1, the single-channel TPPFC converter includes an AC voltage input $V_{AC}$, an inductor $L_1$, switches $Q_1$ and $Q_2$ that can act like switching devices to control the flow of current, switches $Q_3$ and $Q_4$ that can act as line transistors in that the switches $Q_3$ and $Q_4$ are turned on and off at the input line frequency, usually about 50 Hz to about 60 Hz to mimic diodes, and a load capacitance $C_L$. The switches $Q_1$ and $Q_2$ are connected in cascade, and the switches $Q_3$ and $Q_4$ are connected in cascade. The inductor $L_1$ is connected between a terminal of the AC voltage input $V_{AC}$ and a node between the switches $Q_1$ and $Q_2$. The other terminal of the AC voltage input $V_{AC}$ is connected to a node between the switches $Q_3$ and $Q_4$. The load capacitance $C_L$ is connected in parallel with the switches $Q_1$ and $Q_2$ and with the switches $Q_3$ and $Q_4$. The switches $Q_1$, $Q_2$, $Q_3$, and $Q_4$ can be any suitable switches, including MOSFETs, GaN transistors, SiC transistors, or the like.

Figure 2:
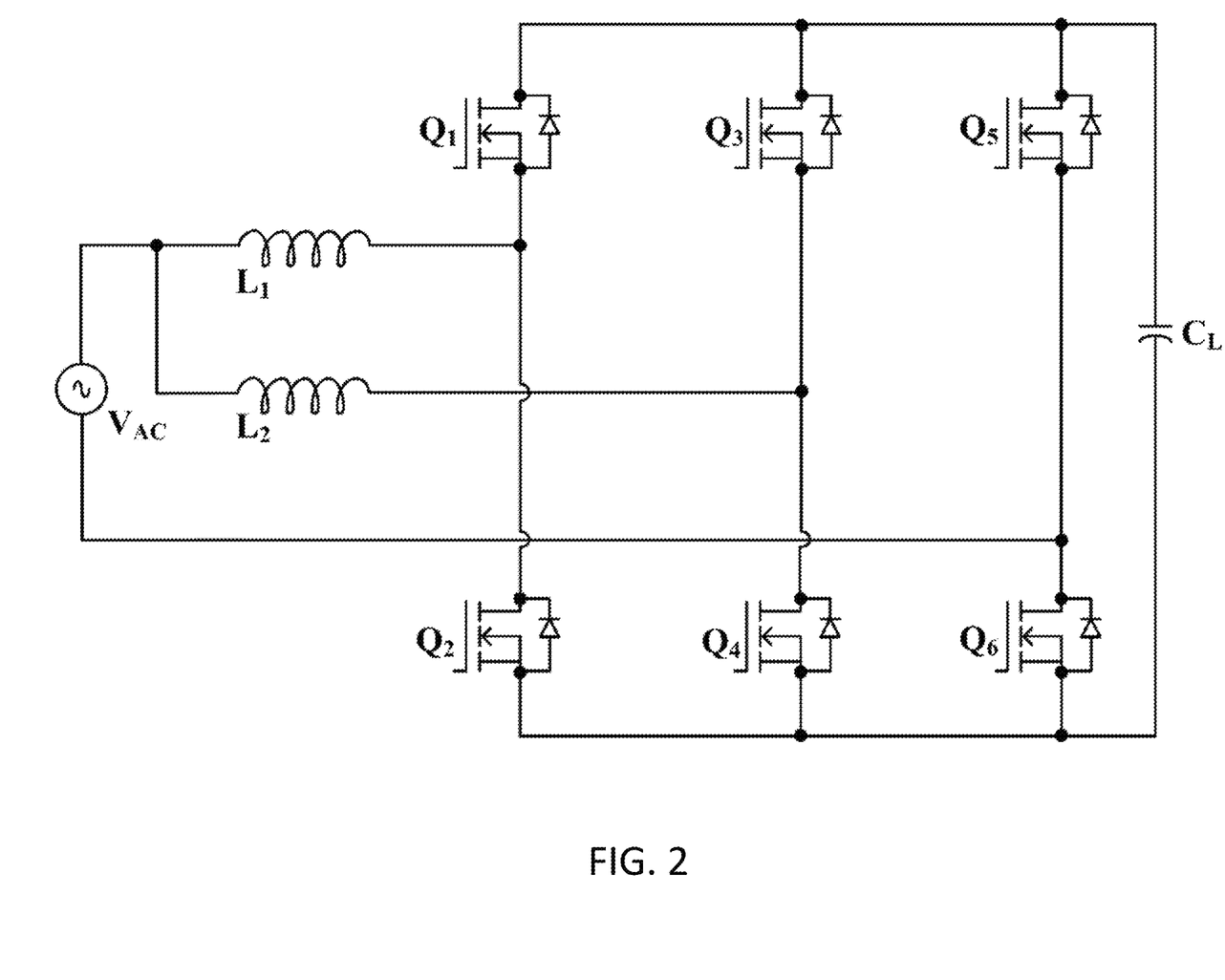
FIG. 2 is a circuit diagram of a dual-channel PFC totem-pole boost converter according to a preferred embodiment of the present invention.

FIG. 2 is a circuit diagram of a dual-channel TPPFC boost converter according to a preferred embodiment of the present invention. FIG. 2 shows a dual-channel TPPFC converter similar to that shown in FIG. 1 and includes an AC voltage input $V_{AC}$, an inductor $L_1$, switches $Q_1$, $Q_2$, $Q_3$, and $Q_4$ that can act like switching devices to control the flow of current, and switches $Q_5$ and $Q_6$ that can act as line transistors in that the switches $Q_5$ and $Q_6$ are turned on and off to mimic diodes, and a load capacitance $C_L$. In the first channel (also referred to as the primary switching leg or channel 1), the inductor $L_1$ is connected between a terminal of the AC voltage input $V_{AC}$ and a node between the switches $Q_1$ and $Q_2$. In the second channel (also referred to as the secondary switching leg or channel 2), the inductor $L_2$ is connected between the same terminal of the AC voltage input $V_{AC}$ as the inductor $L_1$ and a node between the switches $Q_3$ and $Q_4$. The switches $Q_1$ and $Q_2$ are connected in cascade, the switches $Q_3$ and $Q_4$ are connected in cascade, and the switches $Q_5$ and $Q_6$ are connected in cascade. The other terminal of the AC voltage input $V_{AC}$ is connected to a node between the switches $Q_5$ and $Q_6$. The load capacitance $C_L$ is connected in parallel with the switches $Q_1$ and $Q_2$, with the switches $Q_3$ and $Q_4$, and with the switches $Q_5$ and $Q_6$. The switches $Q_1$, $Q_2$, $Q_3$, $Q_4$, $Q_5$, and $Q_6$ can be any suitable switches, including MOSFETs, GaN transistors, SiC transistors, or the like.

Figure 3A:
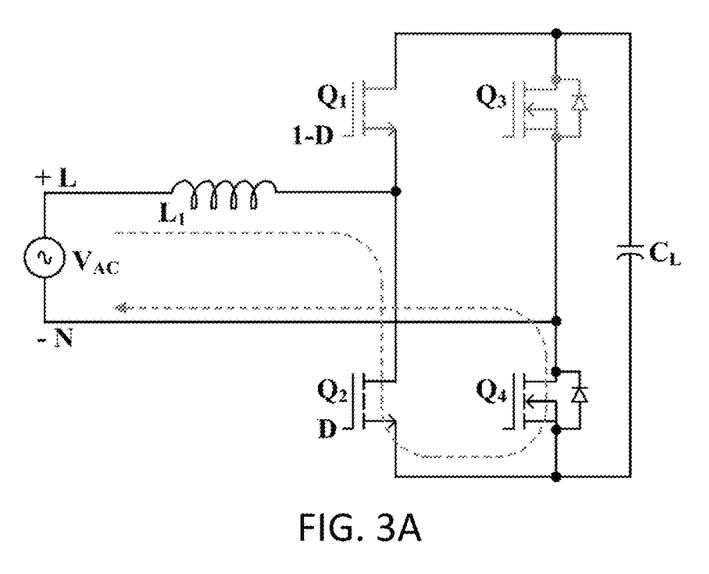
FIGS. 3A-3D are circuit diagrams that show current flow in a single-channel PFC totem-pole boost converter according to a preferred embodiment of the present invention.
Figure 3B:
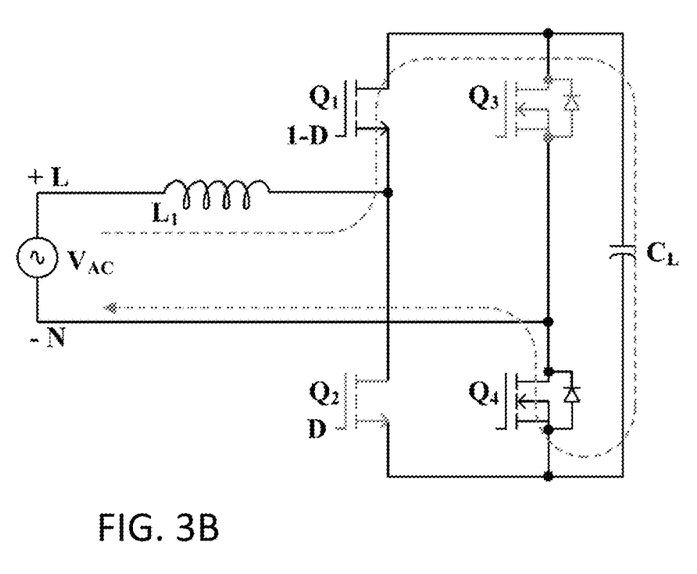
Figure 3C:
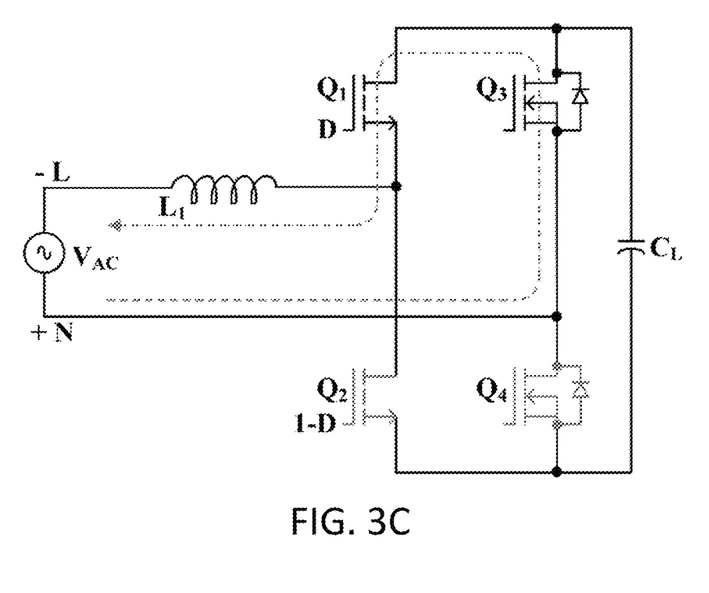
Figure 3D:
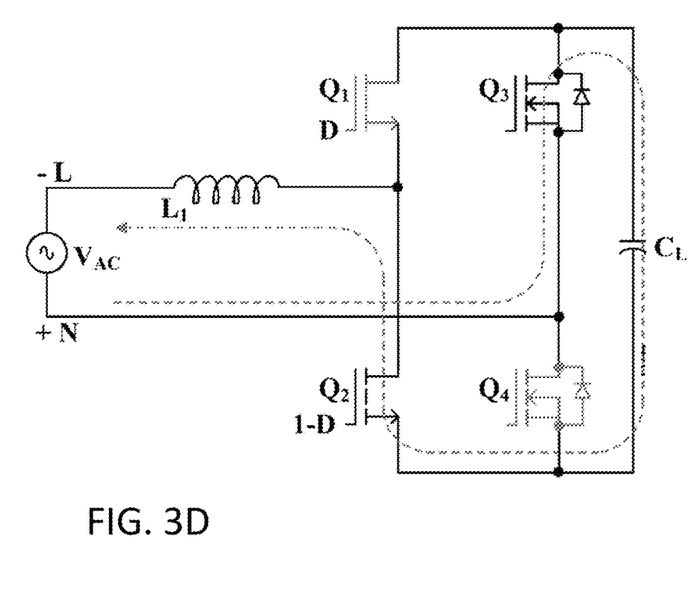

FIGS. 3A-3D are circuit diagrams that show the principle of operation and current flow in a single-channel TPPFC boost converter according to a preferred embodiment of the present invention. FIGS. 3A and 3B show the principle of operation and current flow during the positive AC half-cycle, and FIGS. 3C and 3D show the principle of operation and current flow during the negative AC half-cycle. The current flow in FIGS. 3A-3D is represented by the dotted line arrow. Each switching cycle includes a boost portion as shown FIGS. 3A and 3C in which energy is stored in the inductor $L_1$ and a synchronous portion as shown in FIGS. 3B and 3D in which power is provided to the load. For simplicity, duty cycle D will refer to the boost portion of the switching cycle, and duty cycle 1-D will refer to the synchronous portion of the switching cycle. For switches in a cascade configuration, one switch is turned on for the boost portion of the switching cycle with a duty cycle D and then switched off, while the other transistor is switched on for the remainder of switching cycle, i.e., duty cycle 1-D, and then turned off at the end of the switching cycle. The process is repeated in the next switching cycle.

In FIGS. 3A and 3B, switch $Q_2$ acts as a boost switch in the positive half cycle of the AC voltage during the boost portion of the switching cycle, and switch $Q_1$ acts as a synchronous switch in the positive half cycle of the AC voltage during the synchronous portion of the switching cycle. During the boost portion, switch $Q_2$ is turned ON with a duty cycle D. The duty cycle D is determined by the circuit control for each switching cycle to regulate the output of the converter and is within a range from 0 to 1.

Since switch $Q_2$ is driven by the low-side gate driver, a positive voltage gate-source Vgs is easily provided. In the same positive AC half-cycle and during the synchronous portion of the switching cycle, switch $Q_1$ operates as a synchronous transistor that is turned ON with duty cycle 1-D, as shown in FIG. 3B. The synchronous transistors are switched at the switching frequency, e.g. 100 kHz. As shown in FIGS. 3A and 3B, switch $Q_4$ is ON during the entire positive AC half-cycle.

After the positive AC half-cycle, the input voltage is reversed and the converter begins operation in the negative AC half-cycle as shown in FIGS. 3C and 3D. In the negative AC half-cycle, roles of the switches are swapped. Thus, the switch $Q_1$ is a boost switch during the boost portion of the switching cycle and is turned ON with a duty cycle of D, while switch $Q_2$ is a synchronous transistor during the synchronous portion of the switching cycle and is turned on with a duty cycle 1-D. Switch $Q_3$ is ON during the entire negative AC half-cycle. Therefore, switches $Q_3$ and $Q_4$ alternately change roles according to the line frequency (i.e., 60 Hz or 50 Hz).

In a dual-channel TPPFC topology, the second channel is usually disengaged to eliminate unnecessary switching loses when the power requirement is low to improve efficiency. During light-load operation, the TPPFC converter's output power is entirely provided by the first channel, and in this mode, the TPPFC converter operates as a single-channel TPPFC converter. The second channel of the dual-channel TPPFC converter is required to immediately engage in case of: (i) significant load increase, or (ii) recovery from line drop-out (drop-out ride-through) when both channels should provide power for faster recovery of the TPPFC converter's output voltage. Drop-out is a condition when AC power is lost for a short period of time, usually due to unexpected occurrences in the grid or input power supply. During such drop-out events, the converter should continue to supply rated output power to the load. Power conversion systems can be designed to be able to generate power from internal power storage for a few milliseconds during which the AC input is out of range (i.e., dropped out). The ability of the converter to supply the load without interruption during this type of event is the so-called ride-through capability. However, the problems with operation of the second channel with a bootstrapped power supply for the high-side gate driver described above arise when it is required to engage the second channel in the negative portion of the AC voltage cycle.

Figure 4:
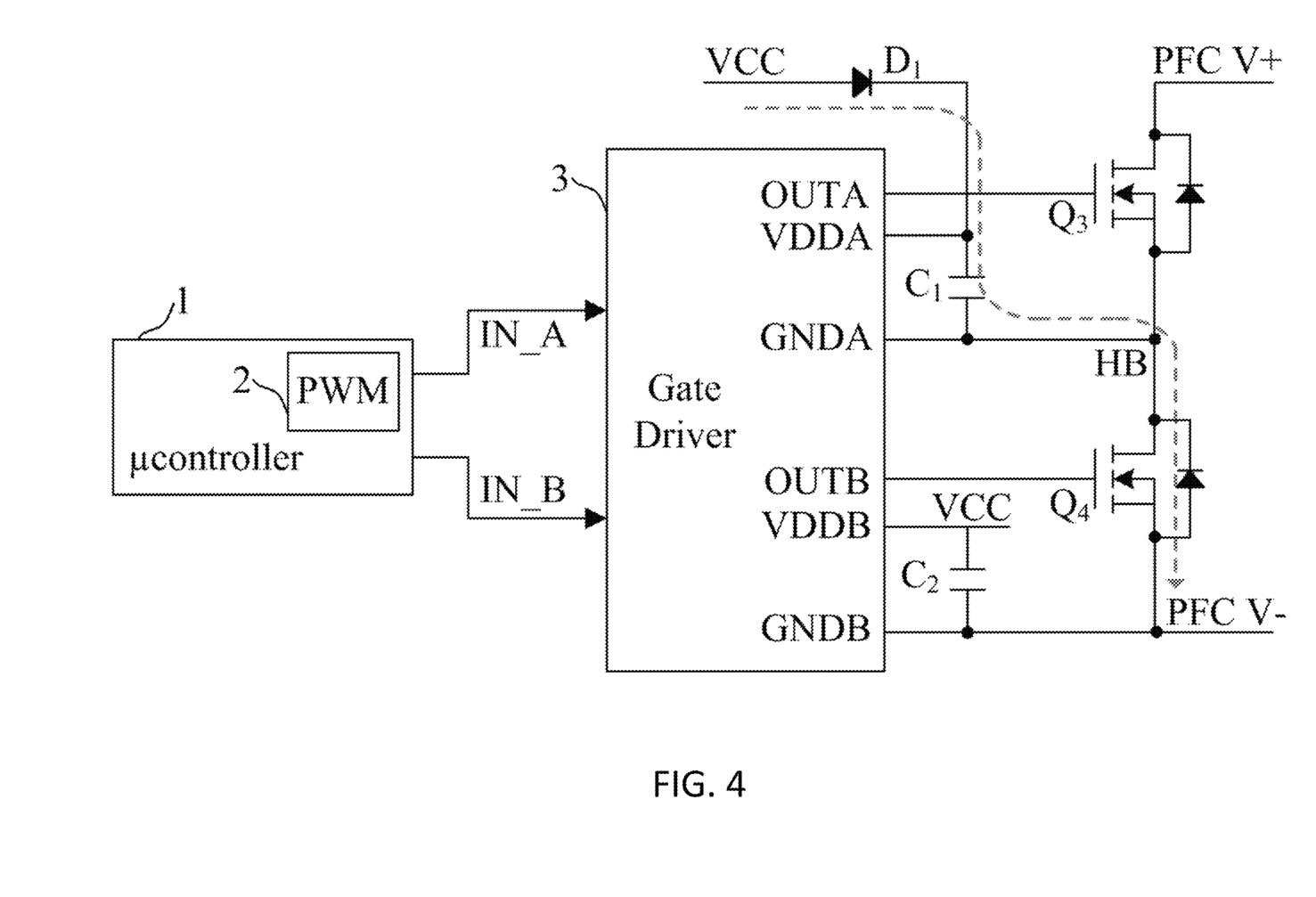
FIG. 4 is a circuit diagram of a gate driver with an external bootstrap circuit according to a preferred embodiment of the present invention.

FIG. 4 is a circuit diagram of a bootstrap pre-charging circuit that includes a gate driver with an external bootstrap power supply according to a preferred embodiment of the present invention. FIG. 4 shows a gate driver circuit 3 with a bootstrapped power supply, including capacitor $C_1$ and diode $D_1$, for the high-side switch $Q_3$ in the second channel of a dual-channel TPPFC converter. The bootstrapped power supply is connected between terminals VDDA and GNDA of the gate driver 3. As shown in FIG. 4, the bootstrap power supply can include bootstrap capacitor $C_1$ and diode $D_1$.

As shown in FIG. 4, the second channel includes switches $Q_3$ and $Q_4$. The $Q_3$-$Q_4$ cascade is connected between the positive output terminal PFC V+ and the negative output terminal PFC V− of the dual-channel TPPFC converter and is joined at the half-bridge node HB. The power supply for the low-side gate driver is connected between terminals VDDB and GNDB. The power supply for the low-side gate driver can include capacitor $C_2$. The power supply for both the high- and low-side switches $Q_3$ and $Q_4$ and input to VDDA and VDDB is VCC. The output driving pulses for the high-side switch $Q_3$ are generated on terminal OUTA of the gate driver 3, while the output driving pulses for the low-side switch $Q_4$ are generated on terminal OUTB of the gate driver 3. The internal pulse width modulator (PWM) 2 of the microcontroller 1 generates the input pulses IN_A and IN_B.

As shown in FIG. 4, the microcontroller 1 and the PWM 2 can be included in a single integrated circuit (IC), and the gate driver 3 can be a separate IC. Other arrangements are possible. For example, the microcontroller 1, PWM 2, and gate driver 3 can be included in a single IC or can each be a separate IC. The ICs can be a dedicated circuit, a general purpose processing unit, a programmable device, or the like. Optionally, the circuit functions can be separate or combined into a single device. That is, the circuitry can be implemented on any type of digital processor regardless of the architecture, including but not limited to a digital signal processor (DSP), programmable intelligence computer (PIC), field-programmable gate array (FPGA), AVR microcontroller, programmable microcontroller, etc. The control algorithm can be executed at arbitrary speed with a custom sampling rate depending on the converter switching frequency. The controller gains and loop bandwidth can be adjusted in a way to fit a design and provide stable control loop.

If the second channel of the TPPFC converter is disengaged, and the switching operation starts in the negative AC half-cycle when the high-side switch $Q_3$ is the boost transistor, the converter will be unable to start operating if the bootstrap capacitor $C_1$ is discharged because the bootstrap capacitor $C_1$ cannot provide the minimum required gate-source voltage Vgs to turn ON switch $Q_3$. Failure to start operating will introduce a delay of up to half an AC cycle.

To eliminate a delay in starting the second channel shown in FIG. 4, the bootstrap capacitor $C_1$ is pre-charged at the beginning of each negative half-cycle after the input voltage zero crossing. The dashed line arrow shown in FIG. 4 represents the current path that is established to charge bootstrap capacitor $C_1$. This current path from the power supply VCC to the PFC V− terminal is available only when low-side switch $Q_4$ is ON.

Figure 5:
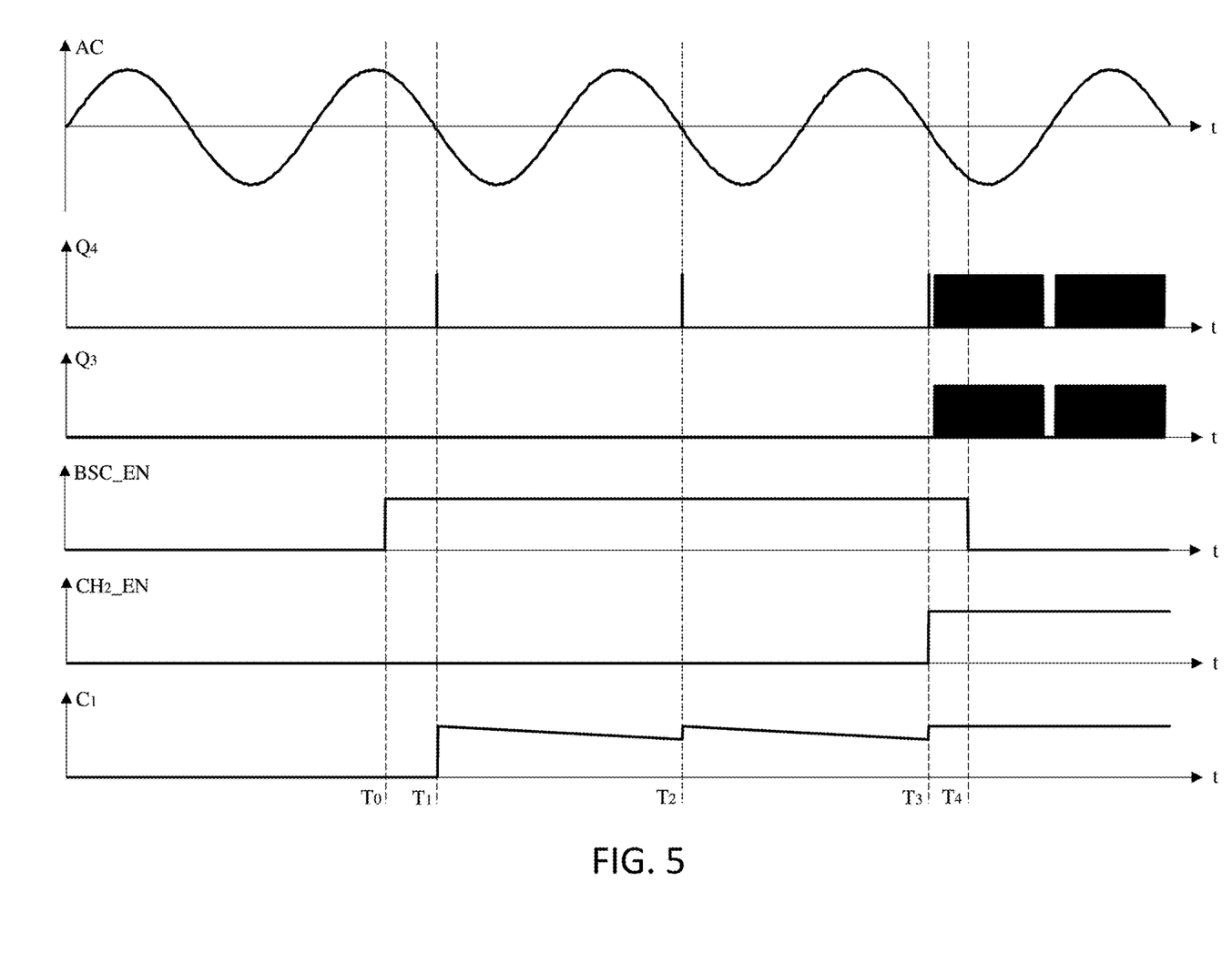
FIG. 5 shows waveforms illustrating operation of a bootstrap pre-charging circuit according to a preferred embodiment of the present invention.

FIG. 5 shows waveforms of driving signals illustrating operation of the bootstrap pre-charging circuit shown in FIG. 4 according to a preferred embodiment of the present invention. FIG. 5 shows that at time $T_0$ a bootstrap circuit enable signal BSC_EN transitions from low to high, which is the enable flag to the pre-charge circuit. Signal BSC_EN is a control signal generated in the microcontroller 1 as part of the control algorithm that controls the pre-charging, and becomes high after power-up initialization. In operation, the PWM 2 drives switches $Q_3$ and $Q_4$ in complementary mode via output terminals OUTA and OUTB. At time $T_1$ during an AC input zero-crossing from a positive AC half cycle to a negative AC half cycle, the PWM 2 independently drives switches $Q_3$ and $Q_4$. In this case, the pre-charge control disables the PWM 2 to switch $Q_3$ to ensure that switch $Q_3$ is safely turned OFF before switching ON switch $Q_4$. This avoids the possibility of a shoot-through by accidentally simultaneously turning ON both switches $Q_3$ and $Q_4$. When switch $Q_4$ is switched ON, the current path to charge $C_1$ is established, and a voltage on bootstrap capacitor $C_1$ rises instantaneously to the voltage level of power supply VCC. The required time to charge bootstrap capacitor $C_1$ is determined in the design process and can be programmed and maintained by the microcontroller 1. If the charging current is limited, the charging period can be extended to several switching cycles.

When the charging of bootstrap capacitor $C_1$ is over at the end of time $T_1$, the PWM 2 control is changed back to the complementary MOSFET drive mode. From time $T_1$ to $T_2$, the voltage across bootstrap capacitor $C_1$ linearly drops due to leakage currents that discharge the bootstrap capacitor $C_1$. Proper selection of bootstrap capacitor $C_1$ is necessary to ensure that stored energy is sufficient to turn ON switch $Q_3$ during the entire interval from time $T_1$ to $T_2$. At time $T_2$, the charging process is repeated to restore the voltage across bootstrap capacitor $C_1$ to the voltage level of power supply VCC. In the same fashion, the procedure to pre-charge bootstrap capacitor $C_1$ is applied at the beginning of each negative AC half cycle of the input voltage. As shown in FIG. 5, at time $T_3$, microcontroller generated signal CH2_EN transitions from low to high, which allows the second channel to start switching, and the TPPFC converter's second channel begins operation. At time $T_4$, signal BSC_EN transitions from high to low to disable the pre-charge circuit. Therefore, switch $Q_4$ charge pulses during an AC input zero-crossing from a positive AC half cycle to a negative AC half cycle. Once switching operation has initiated, pre-charging bootstrap capacitor $C_1$ is no longer needed because the bootstrap capacitor's $C_1$ voltage is maintained by normal operation of the converter.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A power factor correction converter that outputs a DC output voltage from an AC input voltage, the power factor correction converter comprising:
   a first high-side switch and a first low-side switch connected in cascade between a positive output terminal and a negative output terminal of the power factor correction converter and with a first node between the first high-side switch and the first low-side switch;
   a second high-side switch and a second low-side switch connected in cascade between the positive output terminal and the negative output terminal and with a second node between the second high-side switch and the second low-side switch;
   an inductor connected to a first terminal of the AC input voltage and the first node;
   a gate driver connected to the second high-side switch and the second low-side switch;
   a bootstrap circuit connected to the second node and the gate driver; wherein
   the second node is connected to a second terminal of the AC input voltage; and
   the bootstrap circuit is pre-charged at beginnings of negative half-cycles of the AC input voltage.

2. The power factor correction converter of claim 1, wherein
   the first high-side switch and the first low-side switch define a first channel; and
   the second high-side switch and the second low-side switch are line transistors.

3. The power factor correction converter of claim 1, further comprising a third high-side switch and a third low-side switch connected in cascade between the positive output terminal and the negative output terminal and with a third node between the second high-side switch and the second low-side switch; wherein
   the first high-side switch and the first low-side switch define a first channel;
   the second high-side switch and the second low-side switch define a second channel; and
   the third high-side switch and the third low-side switch are line transistors.

4. The power factor correction converter of claim 3, wherein
   the first channel is engaged by turning on and off the first high-side switch and the first low-side switch in a complementary manner; and
   the second channel is disengaged by turning off both the second high-side switch and the second low-side switch, except to turn on the second low-side switch to pre-charge the bootstrap circuit at the beginnings of the negative half-cycles of the AC input voltage.

5. The power factor correction converter of claim 4, wherein, when the second channel is engaged by turning on and off the second high-side switch and the second low-side switch in the complementary manner, the bootstrap circuit is not pre-charged.

6. The power factor correction converter of claim 3, wherein
during positive half-cycles of the AC input voltage:
during boost operation of the first channel, the first low-side switch and the third low-side switch are turned on, and the first high-side switch and the third high-side switch are turned off;
during boost operation of the second channel, the second low-side switch and the third low-side switch are turned on, and the second high-side switch and the third high-side switch are turned off;
during synchronous operation of the first channel, the first high-side switch and the third low-side switch are turned on, and the first low-side switch and the third high-side switch are turned off; and
during synchronous operation of the second channel, the second high-side switch and the third low-side switch are turned on, and the second low-side switch and the third high-side switch are turned off; and
during negative half-cycles of the AC input voltage:
during boost operation of the first channel, the first high-side switch and the third high-side switch are turned on, and the first low-side switch and the third low-side switch are turned off;
during boost operation of the second channel, the second high-side switch and the third high-side switch are turned on, and the second low-side switch and the third low-side switch are turned off;
during synchronous operation of the first channel, the first low-side switch and the third high-side switch are turned on, and the first high-side switch and the third low-side switch are turned off; and
during synchronous operation of the second channel, the second low-side switch and the third high-side switch are turned on, and the second high-side switch and the third low-side switch are turned off.

7. The power factor correction converter of claim 1, wherein the bootstrap circuit includes a diode and a capacitor connected in series with each other; and
pre-charging the bootstrap circuit pre-charges the capacitor.

8. A control circuit for a power factor correction converter that outputs a DC output voltage from an AC input voltage, the control circuit comprising:
a gate driver including:
a high-side driver terminal connected to a high-side switch of the power factor correction converter to turn the high-side switch on and off;
a low-side driver terminal connected to a low-side switch of the power factor correction converter to turn the low-side switch on and off;
a high-side ground terminal connected to a node between the high-side switch and the low-side switch;
a low-side ground terminal connected to a negative output terminal of the power factor correction converter;
a high-side voltage terminal; and
a low-side voltage terminal;
a controller connected to the gate driver;
a bootstrap circuit including:
a bootstrap capacitor connected in parallel with the high-side voltage terminal and the high-side ground terminal and connected to the node; and
a diode connected between the bootstrap capacitor and the low-side voltage terminal; and
a capacitor connected in parallel with the low-side voltage terminal and the low-side ground terminal and connected to the negative output terminal; wherein
the controller is programmed or configured to turn on the low-side switch to pre-charge the bootstrap capacitor at beginnings of negative half-cycles of the AC input voltage.

9. The power factor correction converter including the control circuit of claim 8, wherein the controller disengages a channel of the power factor correction converter by turning off both the high-side switch and the low-side switch, except to turn on the second low-side switch to pre-charge the bootstrap circuit at the beginnings of the negative half-cycles of the AC input voltage.

* * * * *